US012340938B2

(12) United States Patent
Wang et al.

(10) Patent No.: US 12,340,938 B2
(45) Date of Patent: Jun. 24, 2025

(54) 110 kV THREE-PHASE DRY-TYPE TRANSFORMER AND ASSEMBLY METHOD THEREFOR

(71) Applicant: Jiangsu Huapeng Transformer Co., Ltd., Changzhou (CN)

(72) Inventors: Tianping Wang, Changzhou (CN); Qinggan Zeng, Changzhou (CN); Qi Chen, Changzhou (CN); Guowei Zhou, Changzhou (CN); Chenming Shi, Changzhou (CN)

(73) Assignee: Jiangsu Huapeng Transformer Co., Ltd., Changzhou (CN)

( * ) Notice: Subject to any disclaimer, the term of this patent is extended or adjusted under 35 U.S.C. 154(b) by 915 days.

(21) Appl. No.: 17/605,248

(22) PCT Filed: Sep. 6, 2019

(86) PCT No.: PCT/CN2019/104797
§ 371 (c)(1),
(2) Date: Oct. 21, 2021

(87) PCT Pub. No.: WO2020/220552
PCT Pub. Date: Nov. 5, 2020

(65) Prior Publication Data

US 2022/0216004 A1 Jul. 7, 2022

(30) Foreign Application Priority Data

Apr. 30, 2019 (CN) ......................... 201910366006.3

(51) Int. Cl.
*H01F 30/12* (2006.01)
*H01F 27/32* (2006.01)
(Continued)

(52) U.S. Cl.
CPC ......... *H01F 27/324* (2013.01); *H01F 29/025* (2013.01); *H01F 41/125* (2013.01)

(58) Field of Classification Search
CPC ..................................................... H01F 27/324
(Continued)

(56) References Cited

U.S. PATENT DOCUMENTS 5,206,539 A * 4/1993 Kammeter ............ H01F 27/385 336/5
5,343,080 A * 8/1994 Kammeter ............ H01F 27/385 336/5
(Continued)

FOREIGN PATENT DOCUMENTS

CN 2169905 Y 6/1994
CN 201425877 Y 3/2010
(Continued)

OTHER PUBLICATIONS

First office action (CN20191036606.3) dated Jan. 30, 2024.
Second office action (CN20191036606.3) dated Nov. 19, 2024.
PCR search report and written opinion (PCT/CN2019/104797).

*Primary Examiner* — Ronald Hinson
(74) *Attorney, Agent, or Firm* — Laine IP Oy

(57) ABSTRACT

Provided is a three-phase dry-type transformer. The three-phase dry-type transformer comprises three single-phase dry-type transformers connected to each other. Each single-phase transformer comprises an incoming line side high-voltage coil and an outgoing line side high-voltage coil, wherein the incoming line side high-voltage coil is provided with an incoming line end and an outgoing line end, and the outgoing line side high-voltage coil is provided with an incoming line end and an outgoing line end. The outgoing line end of the incoming line side high-voltage coil is connected to the incoming line end of the outgoing line side high-voltage coil, such that the incoming line side high-
(Continued)

voltage coil and the outgoing line side high-voltage coil are connected in series. Further provided is an assembly method.

14 Claims, 5 Drawing Sheets

(51) Int. Cl.
*H01F 29/02* (2006.01)
*H01F 41/12* (2006.01)

(58) Field of Classification Search
USPC ........................................................ 336/5
See application file for complete search history.

(56) References Cited

U.S. PATENT DOCUMENTS

| | | | | |
|---|---|---|---|---|
| 5,434,455 | A * | 7/1995 | Kammeter | H01F 27/385<br>336/5 |
| 5,483,111 | A * | 1/1996 | Kuznetsov | H02K 3/28<br>318/135 |
| 6,208,230 | B1 * | 3/2001 | Shiota | H01F 30/12<br>336/12 |
| 7,307,361 | B1 * | 12/2007 | Bendre | H02M 5/225<br>336/170 |
| 7,990,242 | B2 * | 8/2011 | Owen | H02M 5/14<br>336/12 |
| 8,773,877 | B2 * | 7/2014 | Murai | H05B 45/395<br>307/17 |
| 12,237,677 | B2 * | 2/2025 | Umlauf | H02J 3/241 |
| 2012/0154090 | A1 * | 6/2012 | Noda | B60L 9/16<br>336/148 |
| 2015/0235752 | A1 * | 8/2015 | Stryken | H01F 41/02<br>29/605 |

FOREIGN PATENT DOCUMENTS

| | | | |
|---|---|---|---|
| CN | 102543406 | A | 7/2012 |
| CN | 203366971 | U | 12/2013 |
| CN | 103515071 | A | 1/2014 |
| CN | 204558201 | U | 8/2015 |
| CN | 105469960 | A | 4/2016 |
| CN | 106935385 | A | 7/2017 |
| CN | 106981357 | A | 7/2017 |
| CN | 109448975 | A | 3/2019 |
| CN | 109935455 | A | 6/2019 |
| CN | 209626016 | U | 11/2019 |
| EP | 3043362 | A1 | 7/2016 |

* cited by examiner

110 kV THREE-PHASE DRY-TYPE TRANSFORMER AND ASSEMBLY METHOD THEREFOR

CROSS-REFERENCE TO RELATED APPLICATION

The present application claims the priority to a Chinese patent application with the filing No. CN201910366006.3 filed with the State Intellectual Property Office on Apr. 30, 2019 and entitled "110 kV three-phase dry-type transformer" the content of which is incorporated herein by reference in its entirety.

TECHNICAL FIELD

The present application relates to the technical field of power transformers, in particular to a 110 kV three-phase dry-type transformer and an assembly method therefor.

BACKGROUND ART

At present, the existing three-phase dry-type transformers are mostly applied for a low voltage level, for example 35 kV. When applied for a high voltage level, the existing three-phase dry-type transformers have insufficient insulation capacity and cannot meet the requirement for the insulating voltage resistance capability at a high voltage level.

SUMMARY

An object of an exemplary embodiment of the present application comprises, for example, providing a three-phase dry-type transformer for meeting the requirement for the insulating voltage resistance capability of the three-phase dry-type transformer at a high voltage level, for example, a 110 kV voltage level.

An object of an exemplary embodiment of the present application comprises, for example, providing an assembly method for assembling single-phase dry-type transformers into the above three-phase dry-type transformer.

In order to achieve the above objects, an exemplary embodiment of the present application provides the technical solutions as follows.

An embodiment of the present application provides a three-phase dry-type transformer comprising three single-phase dry-type transformers. Each single-phase dry-type transformer comprises an incoming line side and an outgoing line side. The incoming line side comprises an incoming-line-side iron core column, a first low-voltage coil and an incoming-line-side high-voltage coil, which are provided at intervals in sequence. The outgoing line side comprises an outgoing-line-side iron core column, a second low-voltage coil and an outgoing-line-side high-voltage coil, which are provided at intervals in sequence, and wherein in an exemplary configuration of the single-phase dry-type transformer, the outgoing-line-side iron core column and the above incoming-line-side iron core column are provided opposite to each other. The incoming-line-side high-voltage coil comprises a first incoming-line-side high-voltage coil and a second incoming-line-side high-voltage coil connected in parallel with the first incoming-line-side high-voltage coil. The outgoing-line-side high-voltage coil comprises a first outgoing-line-side high-voltage coil and a second outgoing-line-side high-voltage coil connected in parallel with the first outgoing-line-side high-voltage coil. A first end for connecting in parallel the first incoming-line-side high-voltage coil and the second incoming-line-side high-voltage coil is provided in the middle of or substantially at the middle of the incoming-line-side high-voltage coil, to be used as a first incoming line end, and optionally, a second end for connecting in parallel the first incoming-line-side high-voltage coil and the second incoming-line-side high-voltage coil is provided at an end of the incoming-line-side high-voltage coil, to be used as a first outgoing line end. A first end for connecting in parallel the first outgoing-line-side high-voltage coil and the second outgoing-line-side high-voltage coil is provided in the middle of or substantially at the middle of the outgoing-line-side high-voltage coil, to be used as a second incoming line end, and optionally, a second end for connecting in parallel the first outgoing-line-side high-voltage coil and the second outgoing-line-side high-voltage coil is provided at an end of the outgoing-line-side high-voltage coil, to be used as a second outgoing line end. In this single-phase dry-type transformer, the first outgoing line end and the second incoming line end are connected. The three single-phase dry-type transformers form the three-phase dry-type transformer through connection of their corresponding three second outgoing line ends.

The beneficial effects achieved by the three-phase dry-type transformer provided by the embodiment comprise: by providing the incoming line end of the three-phase dry-type transformer in the middle of or substantially at the middle of the incoming-line-side high-voltage coil of each single-phase dry-type transformer, for example, the lightning surge voltage resistance capability of the incoming line end of each single-phase dry-type transformer is improved, that is, for example, the voltage resistance capability of the high voltage coil of each single-phase dry-type transformer is improved, and then the voltage resistance capability of, for example, the combined three-phase dry-type transformer is improved. The three-phase dry-type transformer meets the requirement for the insulating voltage resistance capability of the three-phase dry-type transformer at a high voltage level, for example, a 110 kV voltage level, thus solving the problem in the prior art that the three-phase dry-type transformers have insufficient insulation capacity at a high voltage level, for example, a 110 kV voltage level. Further, this three-phase dry-type transformer contains no flammable transformer oil or SF6 gas resulting in greenhouse effect, and has a strong resistance capacity to short-circuit. This three-phase dry-type transformer is a flame-retardant and environmentally friendly power transformer.

Optionally, the first incoming line end is formed by connecting line ends of the first incoming-line-side high-voltage coil and of the second incoming-line-side high-voltage coil, which line ends are adjacent to each other in proximity to a position substantially the middle of the incoming-line-side high-voltage coil.

Optionally, the second incoming line end is formed by connecting line ends of the first outgoing-line-side high-voltage coil and of the second outgoing-line-side high-voltage coil, which line ends are adjacent to each other in proximity to a position substantially the middle of the outgoing-line-side high-voltage coil.

Optionally, the single-phase dry-type transformer further comprises a first no-load voltage-regulating tap terminal and a second no-load voltage-regulating tap terminal, wherein the first no-load voltage-regulating tap terminal is provided on the first incoming-line-side high-voltage coil, and the second no-load voltage-regulating tap terminal is provided on the second incoming-line-side high-voltage coil.

With the three-phase dry-type transformer in the optional configuration, after the first no-load voltage-regulating tap terminal and the second no-load voltage-regulating tap terminal are regulated, a rated high voltage at which the transformer operates can be changed within a no-load regulation range.

Optionally, the single-phase dry-type transformer further comprises an on-load voltage-regulating tap switch, a first on-load voltage-regulating tap terminal and a second on-load voltage-regulating tap terminal. The first on-load voltage-regulating tap terminal is provided on the first outgoing-line-side high-voltage coil, and the second on-load voltage-regulating tap terminal is provided on the second outgoing-line-side high-voltage coil. The first on-load voltage-regulating tap terminal comprises a first common end and a plurality of first tap ends. The second on-load voltage-regulating tap terminal comprises a second common end and a plurality of second tap ends. The first common end is connected in parallel with the second common end, and each of the plurality of first tap ends is connected in parallel with a corresponding tap end of the plurality of second tap ends, and they are connected with the on-load voltage-regulating tap switch after the parallel connection. In this optional configuration, the three-phase dry transformer can achieve nine different ranges of on-load voltage regulations.

Optionally, at least one of the first incoming line end, the second incoming line end, the first outgoing line end, and the second outgoing line end is provided with a capacitive screen line. Regarding the three-phase dry-type transformer in this optional configuration, the capacitive screen line can increase the series capacitance at the head and end of the coil, improve the lightning surge voltage distribution, and thus increase the lightning surge voltage resistance capability of the coil.

Optionally, at least one of the first incoming line end, the second incoming line end, the first outgoing line end, and the second outgoing line end is provided with a voltage equalizing cover. Regarding the three-phase dry-type transformer in this optional configuration, the voltage equalizing cover can improve the electric field distribution outside the high voltage coil, and improve the voltage resistance capability of the high voltage coil.

Optionally, a first insulating cylinder is provided between the first low-voltage coil and the incoming-line-side high-voltage coil, and/or a second insulating cylinder is provided between the second low-voltage coil and the outgoing-line-side high-voltage coil.

Optionally, a material of the insulating cylinder is an epoxy resin plus a glass fiber.

Optionally, an insulating partition is provided between the incoming-line-side high-voltage coil and the outgoing-line-side high-voltage coil.

Optionally, at least one of the first low-voltage coil, the second low-voltage coil, the incoming-line-side high-voltage coil, and the outgoing-line-side high*voltage coil is an epoxy resin vacuum-cast solid coil which is a copper conductor (i.e. a solid coil formed of conductive copper by epoxy resin vacuum casting).

Optionally, the single-phase dry-type transformer further comprises a plurality of solid insulating members. The plurality of solid insulating members are respectively configured to support and fix the first low-voltage coil, the second low-voltage coil, the incoming-line-side high-voltage coil, and the outgoing-line-side high-voltage coil. Regarding the three-phase dry-type transformer in this optional configuration, the plurality of solid insulating members enable the low voltage coils and the high voltage coils to be fixed by them, and thus not loosen due to the transportation process or a complicated relation.

An embodiment of the present application further provides an assembly method which can be used to assemble three single-phase dry-type transformers to obtain the above three-phase dry-type transformer, especially a 110 kV three-phase dry-type transformer. The method comprises providing three single-phase dry-type transformers, each single-phase dry-type transformer comprising an incoming line side and an outgoing line side, wherein the incoming line side comprises an incoming-line-side high-voltage coil that provides a first incoming line end and a first outgoing line end, the first incoming line end is located at substantially the middle of the incoming-line-side high-voltage coil, and the outgoing line side comprises an outgoing-line-side high-voltage coil that provides a second incoming line end and a second outgoing line end, and the second incoming line end is located at substantially the middle of the outgoing-line-side high-voltage coil; connecting the first outgoing line end and the second incoming line end of each single-phase dry-type transformer so that the incoming-line-side high-voltage coil and the outgoing-line-side high-voltage coil are connected in series; and making the three single-phase dry-type transformers connected and assembled through their corresponding three second outgoing line ends after the series connection to form the three-phase dry-type transformer.

The assembly method provided in the embodiment obtains a three-phase dry-type transformer that can effectively operate at a high voltage level, especially a 110 kV voltage level, by assembling three specially designed single-phase dry-type transformers. Specifically, the incoming line end of the three-phase dry-type transformer obtained by the assembly method is provided in the middle of or substantially at the middle of the incoming-line-side high-voltage coil of each single-phase dry-type transformer, thus, for example, the lightning surge voltage resistance capability of the incoming line end of each single-phase dry-type transformer is improved, that is, for example, the voltage resistance capability of the high voltage coil of each single-phase dry-type transformer is improved, and then the voltage resistance capability of, for example, the assembled three-phase dry-type transformer is improved.

Other features and advantages of the embodiments of the present application will be described in the following description, and partly become obvious from the description, or can be understood by implementing the embodiments of the present application. The objects and other advantages of the present application can be implemented and obtained through the structure specifically indicated in the drafted description and the drawings.

BRIEF DESCRIPTION OF DRAWINGS

In order to more clearly illustrate the technical solutions of the exemplary embodiments of the present application, the drawings required to be used in the exemplary embodiments of the present application will be briefly introduced below. It should be understood that the following drawings show only some embodiments of the present application and therefore should not be considered as a limitation to the scope, and those skilled in the art may obtain other related drawings in the light of the drawings without any inventive labor.

Figure 1:
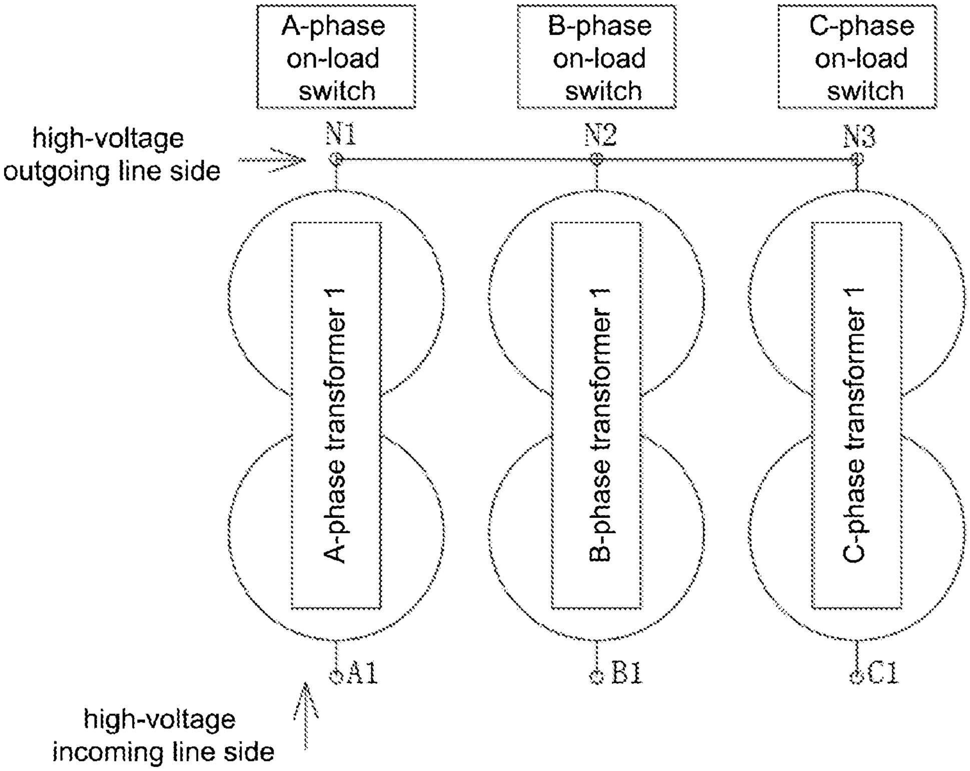
FIG. 1 is a schematic view of a three-phase composition of a three-phase dry-type transformer provided by an embodiment of the present application.

Reference signs: 1—single-phase dry-type transformer; 201—incoming-line-side iron core column; 202—first low-voltage coil; 203—incoming-line-side high-voltage coil; 2031—first incoming line end; 2032—first outgoing line end; 2033—first incoming-line-side high-voltage coil; 2034—second incoming-line-side high-voltage coil; 301—outgoing-line-side iron core column; 302—second low-voltage coil; 303—outgoing-line-side high-voltage coil; 3031—second incoming line end; 3032—second outgoing line end; 3033—first outgoing-line-side high-voltage coil; 3034—second outgoing-line-side high-voltage coil; 40—first no-load voltage-regulating tap terminal; 50—second no-load voltage-regulating tap terminal; 60—on-load voltage-regulating tap switch; 70—first on-load voltage-regulating tap terminal; 701—first common end; 80—second on-load voltage-regulating tap terminal; 801—second common end; 90—capacitive screen line; 91—voltage equalizing cover; 92—first insulating cylinder; 93—second insulating cylinder; 94—insulating partition; 95—solid insulating member.

DETAILED DESCRIPTION OF THE EMBODIMENTS

In order to make the objects, technical solution and advantages of the embodiments of the present application clearer, the technical solutions of the embodiments of the present application will be clearly and completely described in the following with reference to the accompanying drawings, and it is apparent that the described embodiments are some but not all of the embodiments of the present application. The components of the embodiments of the present application, which are generally described and illustrated in the figures herein, may be arranged and designed in a variety of different configurations.

Therefore, the detailed description of the embodiments of the present application set forth in the accompanying drawings is not intended to limit the claimed scope of the present application, but illustrate only selected embodiments of the present application. All other embodiments, obtained by those skilled in the art in light of the embodiments of the present application without inventive efforts, will fall within the claimed scope of the present application.

It should be noted that similar reference numerals and letters indicate similar items in the following figures, and therefore, once an item is defined in a drawing, it is not necessary to further define or explain it in the subsequent drawings.

It should be noted that, in the embodiments of the present application, terms such as "first" and "second" are used only for distinguishing the description, and should not be understood as indicating or implying to have importance in relativity.

According to an exemplary embodiment of the present application, a three-phase dry-type transformer capable of effectively operating at a high voltage level, for example, a 110 kV voltage level, is provided.

Referring to FIG. 1, the three-phase dry-type transformer comprises three single-phase dry-type transformers 1. Each single-phase dry-type transformer 1 comprises an incoming line side and an outgoing line side.

Figure 2:
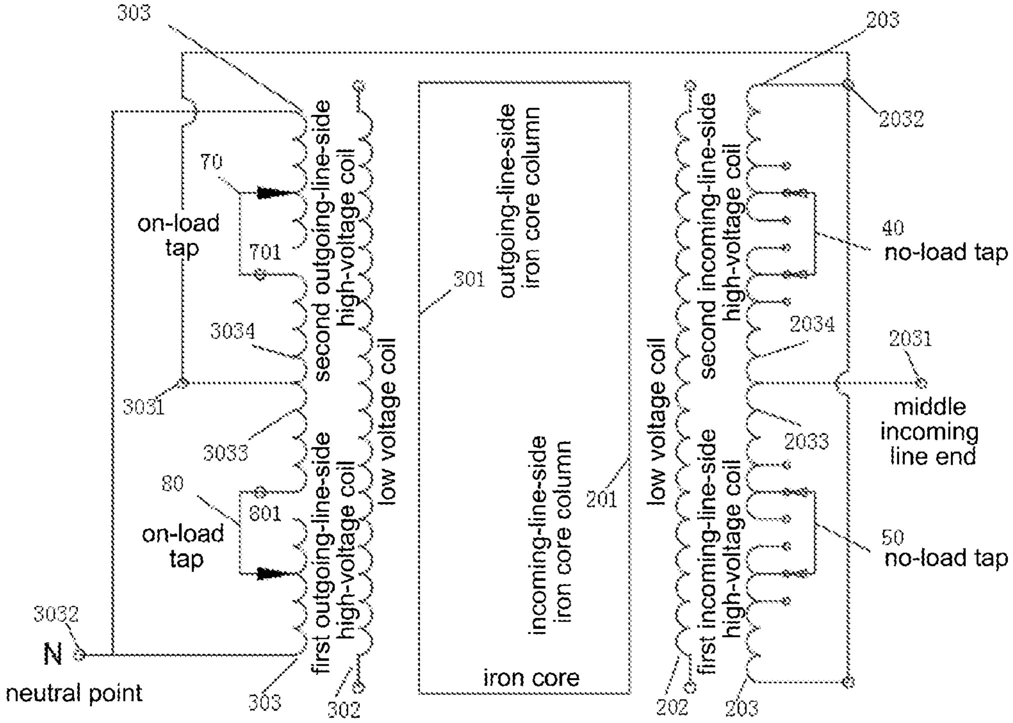
FIG. 2 is a structural schematic view of a single-phase dry-type transformer provided by an embodiment of the present application.

Specifically, referring to FIG. 2, the incoming line side comprises an incoming-line-side iron core column 201, a first low-voltage coil 202 and an incoming-line-side high-voltage coil 203, wherein the incoming-line-side high-voltage coil 203 comprises a first incoming-line-side high-voltage coil 2033 and a second incoming-line-side high-voltage coil 2034 which are connected in parallel; and the outgoing line side comprises an outgoing-line-side iron core column 301, a second low-voltage coil 302 and an outgoing-line-side high-voltage coil 303, wherein the outgoing-line-side high-voltage coil 303 comprises a first outgoing-line-side high-voltage coil 3033 and a second outgoing-line-side high voltage coil 3034 which are connected in parallel.

In the configuration shown in FIG. 2, the incoming-line-side iron core column 201 and the outgoing-line-side iron core column 301 are provided opposite to each other. Further, the incoming-line-side iron core column 201, the first low-voltage coil 202 and the incoming-line-side high-voltage coil 203 are provided in sequence at an interval, and similarly, the outgoing-line-side iron core column 301, the second low-voltage coil 302 and the outgoing-line-side high-voltage coil 303 are provided in sequence at an interval. Those skilled in the art can understand that this configuration is only exemplary instead of restricting.

A first end, i.e., a first parallel terminal, formed by connecting in parallel the first incoming-line-side high-voltage coil 2033 and the second incoming-line-side high-voltage coil 2034 is provided in the middle or substantially at the middle of the incoming-line-side high-voltage coil 203 as the first incoming line end 2031 (i.e., the middle incoming line end as shown in FIG. 2). A second end, i.e., a second parallel terminal, formed by connecting in parallel the first incoming-line-side high-voltage coil 2033 and the second incoming-line-side high-voltage coil 2034 is provided at an end of the incoming-line-side high-voltage coil 203 as the first outgoing line end 2032.

Similarly, a first end formed by connecting in parallel the first outgoing-line-side high-voltage coil 3033 and the second outgoing-line-side high-voltage coil 3034 is provided in the middle of or substantially at the middle of the outgoing-line-side high-voltage coil 303 as a second incoming line end 3031. A second end formed by connecting in parallel the first outgoing-line-side high-voltage coil 3033 and the second outgoing-line-side high-voltage coil 3034 is provided at one end of the outgoing-line-side high-voltage coil 303, to be used as a second outgoing line end 3032.

As shown in FIG. 2, in the single-phase dry-type transformer of the embodiment, the first outgoing line end 2032 is made to be connected with the second incoming line end 3031, so that the incoming-line-side high-voltage coil and the outgoing-line-side high-voltage coil are connected with each other in series.

Based on the single-phase dry-type transformer in the above configuration, such three single-phase dry-type transformers 1 are assembled into a three-phase dry-type transformer through connection of their corresponding three second outgoing line ends 3032, the three-phase dry-type transformer being capable of operating normally at a high voltage level, for example, a 110 kV voltage level.

Figure 3:
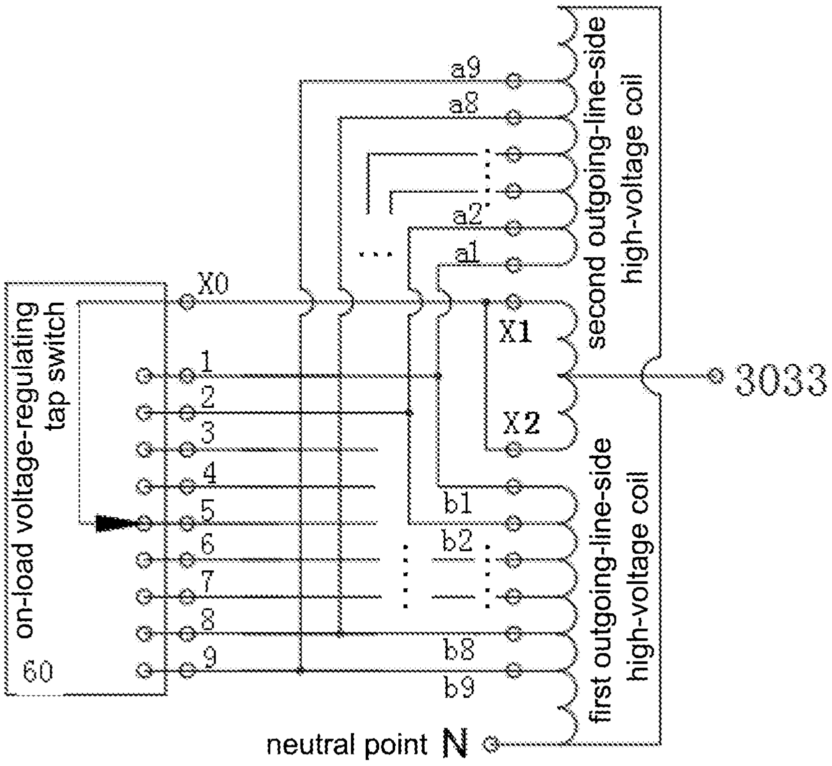
FIG. 3 is a connection schematic view of an on-load voltage-regulating tap terminal provided by an embodiment of the present application.

To facilitate the understanding, the single-phase dry-type transformer with a reference sign A (referred to as an A-phase transformer for short), the single-phase dry transformer with a reference sign B (referred to as a B-phase transformer for short), and the single-phase transformer with a reference sign C (referred to as a C-phase transformer for short) are shown in FIG. 1. For distinguishing here, the first incoming line end 2031 and the second outgoing line end 3032 of each single-phase dry-type transformer are distinguished by different reference signs. Specifically, the incoming line end of the A-phase transformer is indicated by A1, and the outgoing line end thereof is indicated by N1; the incoming line end of the B-phase transformer is indicated by B1, and the outgoing line end thereof is indicated by N2; the incoming line end of the C-phase transformer is indicated by C1, and the outgoing line end thereof is indicated by N3. As can be seen from FIG. 1, the three-phase dry-type transformer consists of three single-phase dry-type transformers connected though N1, N2 and N3. Each single-phase dry-type transformer may further comprise an on-load switch 60 (please see FIG. 3) to be provided at a corresponding outgoing line end.

Turning to FIG. 2 again, the incoming-line-side iron core column 201 and the outgoing-line-side iron core column 301 can be combined to form an iron core. Optionally, the iron core is of a square shape. The right portion of the iron core is the incoming-line-side core column 201, and the incoming-line-side core column 201 is provided outside with a first low-voltage coil 202 and an incoming-line-side high-voltage coil 203 respectively. The left portion of the iron core is outgoing-line-side core column 301, and the outgoing-line-side core column 301 is provided outside with a second low-voltage coil 302 and an outgoing-line-side high-voltage coil 303 respectively.

In the configuration shown in FIG. 2, the first ends configured to connect in parallel the first incoming-line-side high-voltage coil 2033 and the second incoming-line-side high-voltage coil 2034 may be adjacent line ends with a closer distance after the first incoming-line-side high-voltage coil 2033 and the second incoming-line-side high-voltage coil 2034 are connected in parallel; the second ends configured to connect in parallel the first incoming-line-side high-voltage coil 2033 and the second incoming-line-side high-voltage coil 2034 may be adjacent line ends with a far distance after the first incoming-line-side high-voltage coil 2033 and the second incoming-line-side high-voltage coil 2034 are connected in parallel. The first outgoing-line-side high-voltage coil 3033 and the second outgoing-line-side high-voltage coil 3034 of the outgoing line side portion may be configured in a similar fashion.

It should be noted that the forgoing first incoming-line-side high-voltage coil 2033 and second incoming-line-side high-voltage coil 2034 may have consistent sizes, and turns; and the first outgoing-line-side high-voltage coil 3033 and the second outgoing-line-side high-voltage coil 3034 may also have consistent sizes, and turns.

With the three-phase dry-type transformer provided by the exemplary embodiment, by providing the incoming line end of the three-phase transformer at a position substantially the middle of the incoming-line-side high-voltage coil of each single-phase transformer, for example, the lightning surge voltage resistance capability of the incoming line end of each single-phase transformer is improved, that is, for example, the voltage resistance capability of the high voltage coil of each single-phase transformer is improved, and then the voltage resistance capability of the combined three-phase dry-type transformer is improved, which meets the requirement for the insulating voltage resistance capability of the three-phase dry-type transformer at a high voltage level, for example, a 110 kV voltage level. This three-phase dry-type transformer solves the problem in the prior art that the three-phase dry-type transformer has insufficient insulation performance, and this three-phase dry-type transformer contains no flammable transformer oil or SF6 gas resulting in the greenhouse effect, and has a strong resistance capacity to short-circuit. This three-phase dry-type transformer is a flame-retardant and environmentally friendly power transformer.

In an optional example of the embodiment, and as further shown in FIG. 2, the single-phase dry-type transformer 1 may further comprise a first no-load voltage-regulating tap terminal 40 and a second no-load voltage-regulating tap terminal 50. Optionally, the first no-load voltage-regulating tap terminal 40 is provided on the first incoming-line-side high-voltage coil 2033, and optionally, the second no-load voltage-regulating tap terminal 50 is provided on the second incoming-line-side high-voltage coil 2034.

With the single-phase dry-type transformer 1 in this optional configuration, after the first no-load voltage-regulating tap terminal 40 and the second no-load voltage-regulating tap terminal 50 are provided, a rated high voltage at which the transformer operates can be changed within a no-load regulation range by correspondingly regulating the first no-load voltage-regulating tap terminal 40 and the second no-load voltage-regulating tap terminal 50 to the same gear in case of power-down of the transformer.

In an optional embodiment of the embodiment, referring again to FIGS. 2 and 3, the single-phase dry-type transformer 1 may further comprise an on-load voltage-regulating tap switch 60, a first on-load voltage-regulating tap terminal 70 and a second on-load voltage-regulating tap terminal 80. Optionally, the first on-load voltage-regulating tap terminal 70 is provided on the first outgoing-line-side high-voltage coil 3033, and optionally, the second on-load voltage-regulating tap terminal 80 is provided on the second outgoing-line-side high-voltage coil 3034. The first on-load voltage-regulating tap terminal 70 may comprise a first common end 701 and a plurality of first tap ends (see detailed description with respect to FIG. 3 below). The second on-load voltage-regulating tap terminal 80 may comprise a second common end 801 and a plurality of second tap ends (see detailed description with respect to FIG. 3 below). The first common end 701 is connected in parallel with the second common end 801, and each of the plurality of first tap ends is connected in parallel with a corresponding second tap end of the plurality of second tap ends, and they are connected with the on-load voltage-regulating tap switch 60 after their respective parallel connections.

Specifically, the first common end 701 is connected in parallel with the second common end 801, forming a common parallelly-connected terminal, and the common parallelly-connected terminal is connected to the on-load voltage-regulating tap switch 60; each of the plurality of first tap ends is connected in parallel with a corresponding second tap end of the plurality of second tap ends, forming a plurality of tap parallelly-connected terminals, and the plurality of tap parallelly-connected terminals are connected with the on-load voltage-regulating tap switch 60 respectively. The on-load voltage-regulating tap switch 60 can selectively connect the common parallelly-connected terminal to the plurality of tap parallelly-connected terminals within a desired on-load voltage regulation range.

More specifically, referring to FIG. 3 again, in the single-phase dry-type transformer 1, the first outgoing-line-side high-voltage coil 3033 is provided thereon with a first common end 701 of the first on-load voltage-regulating tap terminal 70 (denoted by X1 hereinafter) and the first tap ends a1 to a9; the second outgoing-line-side high-voltage coil 3034 is provided thereon with the second common end 801 of the second on-load voltage-regulating tap terminal 80 (hereinafter denoted by X2 hereinafter) and the second tap ends b1 to b9. The first common end 701 and the second common end 801 are connected in parallel, forming a common parallelly-connected terminal X0, and then the common parallelly-connected terminal X0 is connected to the on-load voltage-regulating tap switch 60. The first tap end aj and the second tap end bj are connected in parallel, where j=1, 2, . . . 9, forming tap parallelly-connected terminals 1-9, and then the tap parallelly-connected terminals 1-9 are respectively connected to the on-load voltage-regulating tap switch 60. The on-load voltage-regulating tap switch 60 can selectively connect the parallelly connected common terminal X0 to any one of the parallelly-connected terminals 1 to 9 of respective tap terminals, thereby realizing nine different ranges of on-load voltage regulations.

Figure 4:
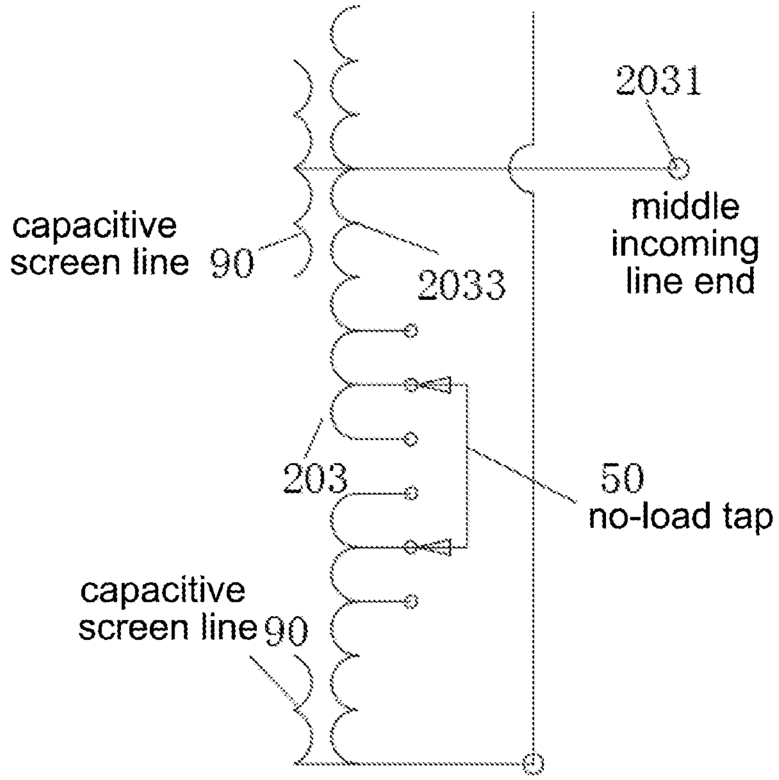
FIG. 4 is a schematic view of a capacitive screen line provided by an embodiment of the present application.

In the optional example of the embodiment, at least one of the first incoming line end 2031, the second incoming line end 3031, the first outgoing line end 2032, and the second outgoing line end 3032 may be provided thereon with a capacitive screen line 90. Referring to FIG. 4, a configuration in which a capacitive screen line 90 is provided at the incoming line side portion is schematically illustrated. The optional configuration process of the capacitive screen line 90 is to wind the capacitive screen line an opposite direction when winding the coil. In the course of using the transformer, the capacitive screen line 90 does not have coil load current to flow through. The capacitive screen line 90 can for example increase the series capacitance at the head and end of the coil, improve the lightning surge voltage distribution, and thus increase the lightning surge voltage resistance capability of the coil.

Figure 5:
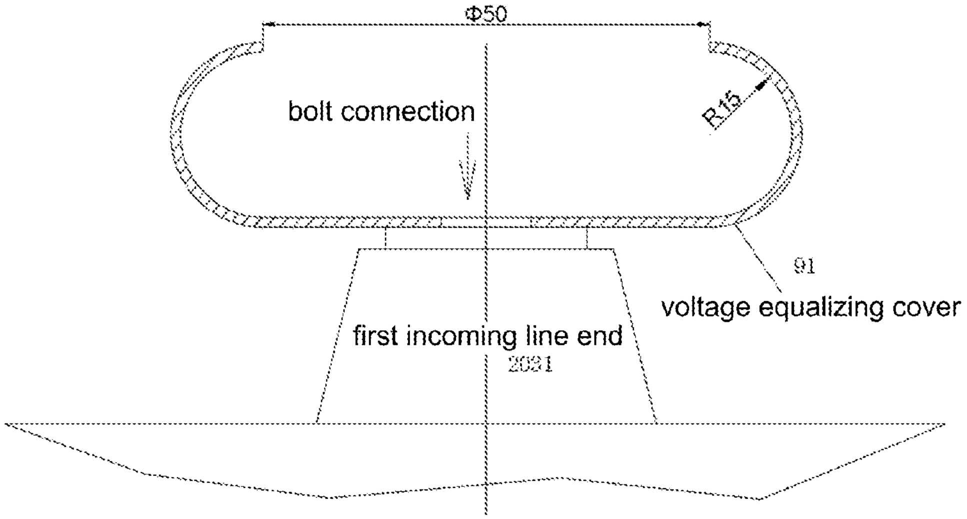
FIG. 5 is a structural schematic view of a voltage equalizing cover provided by an embodiment of the present application.

In the optional example of the embodiment, referring to FIG. 5, at least one of the first incoming line end 2031, the second incoming line end 3031, the first outgoing line end 2032, and the second outgoing line end 3032 may be provided with a voltage equalizing cover 91. The voltage equalizing cover 91 may be connected with the first incoming line end 2031 by a bolt, and the voltage equalizing cover may also be connected with other wiring terminals in the same manner. The outer shell of the voltage equalizing cover 91 may be made of copper foil of about 1 mm, but a thinner or thicker copper foil is also possible. The voltage equalizing cover 91 may improve the electric field distribution outside the high voltage coil, and thus improve the voltage resistance capability of the high voltage coil.

Figure 6:
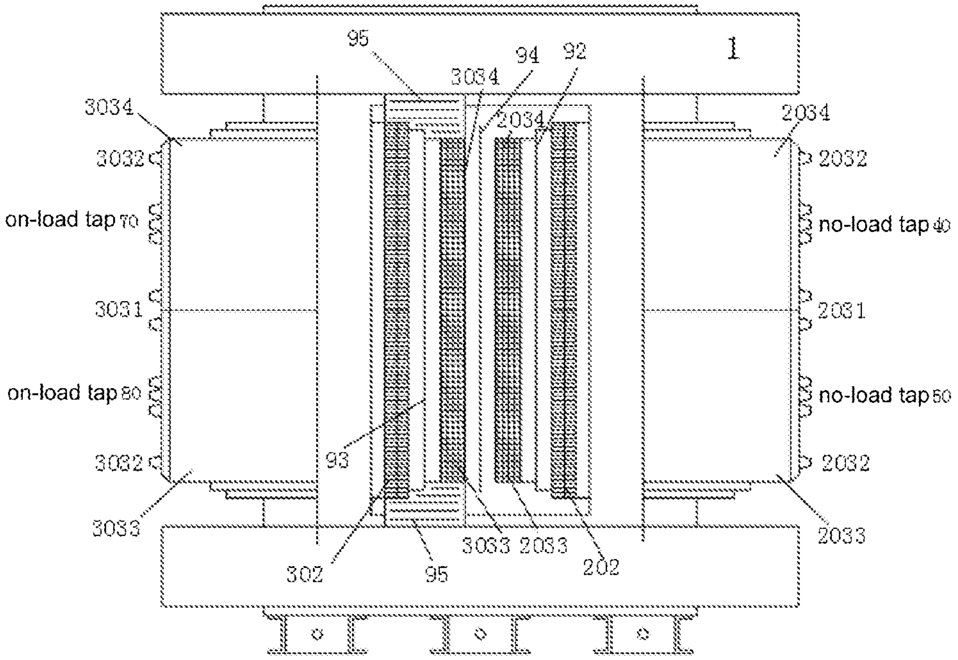
FIG. 6 is a structural schematic view of an outer profile of a single-phase dry-type transformer provided by an embodiment of the present application.

In the optional example of the embodiment, as can be seen from the structural schematic view of an outer profile of the single-phase dry-type transformer 1 in FIG. 6, a first insulating cylinder 92 is provided between the first low-voltage coil 202 and the incoming-line-side high-voltage coil 203, and/or a second insulating cylinder 93 is provided between the second low-voltage coil 302 and the outgoing-line-side high-voltage coil 303. An insulating partition 94 may be provided between the incoming-line-side high-voltage coil 203 and the outgoing-line-side high-voltage coil 303. A material of the insulating cylinder 92, the insulating cylinder 93, and the insulating partition 94 may be an epoxy resin plus a glass fiber.

Further, the single-phase dry-type transformer 1 may further comprise a plurality of solid insulating members 95. The plurality of solid insulating members 95 may be configured to support and/or fix the first low-voltage coil 202, the second low-voltage coil 302, the incoming-line-side high-voltage coil 203, and the outgoing-line-side high-voltage coil 303 (a fixed insulating member 95 on the top and a fixed insulating member at the bottom are schematically shown in the figure only). There is air capable of insulating and dissipating heat in the surrounding environment of the low voltage coil and the high voltage coil.

An embodiment of the present application further provides an assembly method for a three-phase dry-type transformer, especially for a 110 kV three-phase dry-type transformer.

Figure 7:
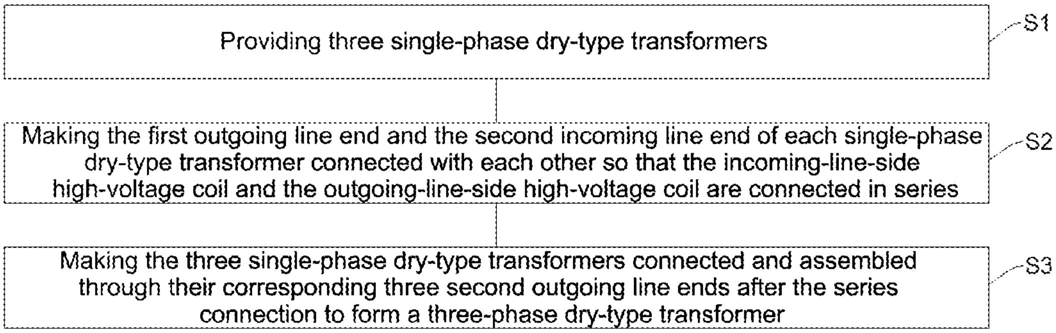
FIG. 7 is a schematic view of a flowchart of an assembly method provided by an embodiment of the present application.

Specifically, referring to FIG. 7, the method comprises: step S1, providing three single-phase dry-type transformers, each single-phase dry-type transformer 1 comprising an incoming line side and an outgoing line side, wherein the incoming line side comprises an incoming-line-side high-voltage coil 203 that provides a first incoming line end 2031 and a first outgoing line end 2032, the first incoming line end 2031 is located at substantially the middle of the incoming-line-side high-voltage coil 2031, and the outgoing line side comprises an outgoing-line-side high-voltage coil 303 that provides a second incoming line end 3031 and a second outgoing line end 3032, and the second incoming line end 3031 is located at substantially the middle of the outgoing-line-side high-voltage coil 303; step S2, making the first outgoing line end 2032 and the second incoming line end 3031 of each single-phase dry-type transformer 1 connected with each other so that the incoming-line-side high-voltage coil 203 and the outgoing-line-side high-voltage coil 303 are connected with each other in series; and step S3, making the three single-phase dry-type transformers 1 connected and assembled through their corresponding three second outgoing line ends 3032 after the series connection to form a three-phase dry-type transformer.

Optionally, the incoming-line-side high-voltage coil 203 comprises a first incoming-line-side high-voltage coil 2033 and a second incoming-line-side high-voltage coil 3024 connected in parallel with the first incoming-line-side high-voltage coil 2033, and the outgoing-line-side high-voltage coil 303 comprises a first outgoing-line-side high-voltage coil 3033 and a second outgoing-line-side high-voltage coil 3034 connected in parallel with first outgoing-line-side high-voltage coil 3033; a first end configured to connect in parallel the first incoming-line-side high-voltage coil 2033 and the second incoming-line-side high-voltage coil 2034 is provided substantially at the middle of the incoming-line-side high-voltage coil 203 as a first incoming line end 2031, and a second end configured to connect in parallel the first incoming-line-side high-voltage coil 2033 and the second incoming-line-side high-voltage coil 2034 is provided at an end of the incoming-line-side high-voltage coil 203 as a first outgoing line end 2032; and a first end configured to connect in parallel the first outgoing-line-side high-voltage coil 3033 and the second outgoing-line-side high-voltage coil 3034 is provided substantially at the middle of the outgoing-line-side high-voltage coil 303 as a second incoming line end 3031, and a second end configured to connect in parallel the first outgoing-line-side high-voltage coil 3033 and the second outgoing-line-side high-voltage coil 3034 is provided at an end of the outgoing-line-side high-voltage coil 303 as a second outgoing line end 3032.

In the optional example of the embodiment, the first incoming line end 2031 is formed by connecting terminals of the first incoming-line-side high-voltage coil 2033 and of the second incoming-line-side high-voltage coil 2034, which terminals are adjacent to each other in proximity to substantially the middle of the incoming-line-side high-voltage coil 203.

In the optional example of the embodiment, the second incoming line end 3031 is formed by connecting terminals of the first outgoing-line-side high-voltage coil 3033 and of the second outgoing-line-side high-voltage coil 3034, which terminals are adjacent to each other in proximity to substantially the middle of the outgoing-line-side high-voltage coil 303.

The assembly method provided in the embodiment obtains a three-phase dry-type transformer that can effectively operate at a high voltage level, for example a 110 kV voltage level, by assembling three specially designed single-phase dry-type transformers. The incoming line end of the three-phase dry-type transformer obtained by the assembly method is provided in the middle of or substantially at the middle of the incoming-line-side high-voltage coil of each single-phase dry-type transformer, for example, the lightning surge voltage resistance capability of the incoming line end of each single-phase dry-type transformer is improved, that is, for example, the voltage resistance capability of the high voltage coil of each single-phase dry-type transformer is improved, and then the voltage resistance capability of, for example, the assembled three-phase dry-type transformer is improved.

What described above are only specific embodiments of the present application, and the scope of protection of the present application is not limited thereto, and changes or substitutions that any technician familiar with the technique u the art would easily conceive of within the technical scope of the present application should be covered by the scope of the present application. Therefore, the scope of protection of the present application should be determined by the scope of the claims.

INDUSTRIAL APPLICABILITY

With the 110 kV three-phase dry-type transformer and the assembly method therefor provided by the embodiments of the present application, for example, by providing the incoming line end of the three-phase dry-type transformer substantially at the middle of the incoming-line-side high-voltage coil of each single-phase dry-type transformer, for example, the lightning surge voltage resistance capability of the incoming line end of each single-phase dry-type transformer is improved, that is, the voltage resistance capability of the high voltage coil of each single-phase dry-type transformer is improved, and then the voltage resistance capability of, for example, the combined three-phase dry-type transformer is improved.

The invention claimed is:

1. A 110 kV three-phase dry-type transformer, wherein the 110 kV three-phase dry-type transformer comprises three single-phase dry-type transformers, and each single-phase dry-type transformer comprises:

an incoming line side and an outgoing line side, the incoming line side comprising an incoming-line-side iron core column, a first low-voltage coil and an incoming-line-side high-voltage coil, the outgoing line side comprising an outgoing-line-side iron core column, a second low-voltage coil and an outgoing-line-side high-voltage coil; the incoming-line-side high-voltage coil comprising a first incoming-line-side high-voltage coil and a second incoming-line-side high-voltage coil, the outgoing-line-side high-voltage coil comprising a first outgoing-line-side high-voltage coil and a second outgoing-line-side high-voltage coil, the first incoming-line-side high-voltage coil being connected in parallel with the second incoming-line-side high-voltage coil, and the first outgoing-line-side high-voltage coil being connected in parallel with the second outgoing-line-side high-voltage coil;

the incoming-line-side iron core column and the outgoing-line-side iron core column being provided opposite to each other, the incoming-line-side iron core column, the first low-voltage coil and the incoming-line-side high-voltage coil being provided in sequence at an interval, and the outgoing-line-side iron core column, the second low-voltage coil and the outgoing-line-side high-voltage coil being provided in sequence at an interval;

a first end for connecting in parallel the first incoming-line-side high-voltage coil and the second incoming-line-side high-voltage coil being provided in a middle of the incoming-line-side high-voltage coil as a first incoming line end, and a second end for connecting in parallel the first incoming-line-side high-voltage coil and the second incoming-line-side high-voltage coil being provided at an end of the incoming-line-side high-voltage coil as a first outgoing line end;

a first end for connecting in parallel the first outgoing-line-side high-voltage coil and the second outgoing-line-side high-voltage coil being provided in a middle of the outgoing-line-side high-voltage coil as a second incoming line end, and a second end for connecting in parallel the first outgoing-line-side high-voltage coil and the second outgoing-line-side high-voltage coil being provided at an end of the outgoing-line-side high-voltage coil as a second outgoing line end;

the first outgoing line end being connected with the second incoming line end; and the three single-phase dry-type transformers being connected through three second outgoing line ends.

2. The 110 kV three-phase dry-type transformer according to claim 1, wherein the single-phase dry-type transformer further comprises a first no-load voltage-regulating tap terminal and a second no-load voltage-regulating tap terminal, wherein the first no-load voltage-regulating tap terminal is provided on the first incoming-line-side high-voltage coil, and the second no-load voltage-regulating tap terminal is provided on the second incoming-line-side high-voltage coil.

3. The 110 kV three-phase dry-type transformer according to claim 1, wherein the first incoming line end is formed by connecting terminals of the first incoming-line-side high-voltage coil and of the second incoming-line-side high-voltage coil, with the terminals being adjacent to each other in proximity to the middle of the incoming-line-side high-voltage coil.

4. The 110 kV three-phase dry-type transformer according to claim 1, wherein the second incoming line end is formed by connecting terminals of the first outgoing-line-side high-voltage coil and of the second outgoing-line-side high-voltage coil, with the terminals being adjacent to each other in proximity to the middle of the outgoing-line-side high-voltage coil.

5. The 110 kV three-phase dry-type transformer according to claim 1, wherein at least one of the first incoming line end, the second incoming line end, the first outgoing line end, and the second outgoing line end is provided with a capacitive screen line.

6. The 110 kV three-phase dry-type transformer according to claim 1, wherein at least one of the first incoming line end, the second incoming line end, the first outgoing line end, and the second outgoing line end is provided with a voltage equalizing cover.

7. The 110 kV three-phase dry-type transformer according to claim 1, wherein the single-phase dry-type transformer further comprises an on-load voltage-regulating tap switch, a first on-load voltage-regulating tap terminal and a second on-load voltage-regulating tap terminal, the first on-load voltage-regulating tap terminal is provided on the first outgoing-line-side high-voltage coil, and the second on-load voltage-regulating tap terminal is provided on the second outgoing-line-side high-voltage coil, the first on-load voltage-regulating tap terminal comprises a first common end and a plurality of first tap ends, and the second on-load voltage-regulating tap terminal comprises a second common end and a plurality of second tap ends, wherein the first common end is connected in parallel with the second common end for forming a common parallelly-connected terminal, and the common parallelly-connected terminal is connected to the on-load voltage-regulating tap switch, and wherein each of the plurality of first tap ends is connected in parallel with a corresponding second tap end of the plurality of second tap ends for forming a plurality of tap parallelly-connected terminals, and the plurality of tap parallelly-connected terminals are connected with the on-load voltage-regulating tap switch.

8. The 110 kV three-phase dry-type transformer according to claim 7, wherein at least one of the first incoming line end, the second incoming line end, the first outgoing line end, and the second outgoing line end is provided with a capacitive screen line.

9. The 110 kV three-phase dry-type transformer according to claim 7, wherein at least one of the first incoming line end, the second incoming line end, the first outgoing line end, and the second outgoing line end is provided with a voltage equalizing cover.

10. The 110 kV three-phase dry-type transformer according to claim 7, wherein a first insulating cylinder is provided between the first low-voltage coil and the incoming-line-side high-voltage coil, and/or a second insulating cylinder is provided between the second low-voltage coil and the outgoing-line-side high-voltage coil.

11. The 110 kV three-phase dry-type transformer according to claim 10, wherein a material of the insulating cylinder is an epoxy resin plus a glass fiber.

12. The 110 kV three-phase dry-type transformer according to claim 7, wherein an insulating partition is provided between the incoming-line-side high-voltage coil and the outgoing-line-side high-voltage coil.

13. The 110 kV three-phase dry-type transformer according to claim 7, wherein at least one of the first low-voltage coil, the second low-voltage coil, the incoming-line-side high-voltage coil, and the outgoing-line-side high-voltage coil is an epoxy resin vacuum-cast solid coil, which is a copper conductor.

14. The 110 kV three-phase dry-type transformer according to claim 7, wherein the single-phase dry-type transformer further comprises a plurality of solid insulating members which are configured to support and/or fix the first low-voltage coil, the second low-voltage coil, the incoming-line-side high-voltage coil, and the outgoing-line-side high-voltage coil.

* * * * *